(12) United States Patent
Wei et al.

(10) Patent No.: US 9,658,947 B2
(45) Date of Patent: May 23, 2017

(54) METHOD FOR RANKING FAULT-TEST PAIRS BASED ON WAVEFORM STATISTICS IN A MUTATION-BASED TEST PROGRAM EVALUATION SYSTEM

(71) Applicant: Synopsys, Inc., Mountain View, CA (US)

(72) Inventors: Tien-Chun Wei, New Taipei (TW); Jean-Marc Albert Forey, Grenoble (FR); Kai Yang, Fremont, CA (US); Kuo-Ching Lin, Taichung (TW); Michael Lyons, Voreppe (FR)

(73) Assignee: SYNOPSYS, INC., Mountain View, CA (US)

( * ) Notice: Subject to any disclaimer, the term of this patent is extended or adjusted under 35 U.S.C. 154(b) by 616 days.

(21) Appl. No.: 13/769,028

(22) Filed: Feb. 15, 2013

(65) Prior Publication Data
US 2014/0136900 A1    May 15, 2014

Related U.S. Application Data

(60) Provisional application No. 61/600,033, filed on Feb. 17, 2012.

(51) Int. Cl.
*G06F 11/36* (2006.01)
(52) U.S. Cl.
CPC .............. *G06F 11/3692* (2013.01)

(58) Field of Classification Search
CPC .................................................. G06F 11/3692
USPC ..................... 370/245; 702/185, 179; 714/37
See application file for complete search history.

(56) References Cited

U.S. PATENT DOCUMENTS

| 5,036,318 A | * | 7/1991 | Bachhuber | G06F 11/327 370/245 |
| 2006/0111873 A1 | * | 5/2006 | Huang | G01B 31/318547 702/185 |

* cited by examiner

*Primary Examiner* — Mischita Henson
(74) *Attorney, Agent, or Firm* — Alston & Bird LLP

(57) ABSTRACT

Ranking of fault-test pairs is performed using first and second multitudes of waveform statistics. The first multitude of waveform statistics includes first value-change information regarding variations in logics HIGH and LOW for each bit of each reference output resulting from a test run of the design code. The second multitude of waveform statistics includes second value-change information regarding variations in logics HIGH and LOW for each bit of each faulty output resulting from a test run of the design code injected with a fault. Relative differences between the first and second multitudes of waveform statistics for each bit of each faulty output with respect to the corresponding reference output are determined. A waveform difference based on the relative differences for each signal of each faulty output is determined. A ranking result of fault-test pairs is determined according to the waveform differences of the faulty outputs.

28 Claims, 4 Drawing Sheets

METHOD FOR RANKING FAULT-TEST PAIRS BASED ON WAVEFORM STATISTICS IN A MUTATION-BASED TEST PROGRAM EVALUATION SYSTEM

CROSS-REFERENCE TO RELATED APPLICATIONS

This application claims priority to U.S. Provisional Application No. 61/600,033, filed on Feb. 17, 2012, the entirety of which is incorporated herein by reference.

BACKGROUND OF THE INVENTION

The disclosure relates generally to verification for designs, and, more particularly, to rank fault-test pairs based on waveform statistics in a mutation-based test program evaluation system.

It is well known in integrated circuit (IC) design that a complex integrated circuit can contain errors. Different techniques are therefore used to check the operation of an integrated circuit or of a computer program modeling the integrated circuit. Typically, a test suite is performed, each test indicating whether an error has been detected or not in the integrated circuit.

Mutation analysis is a test evaluation technique which requires large computing resources. When mutation analysis is performed, errors, faults, or mutations are inserted in an initially non-mutated program or design code. Then, a check is made to determine whether the tests can detect the inserted mutations. When, with a predetermined test, a mutated program provides an identical result to a result provided by the non-mutated program executed with the predetermined test, the mutation is identified as being non-detected. On the other hand, when the result provided by the mutated program, with a predetermined test, is different from the result provided by the non-mutated program executed with the predetermined test, the mutation is identified as being detected. The test is stopped and a next mutation analysis is performed. The tests enabling mutations to be detected are retained for an improved test suite. The advantage of mutation analysis is to evaluate the quality of the test suite and to optimize the test suite if necessary.

If the tests are performed for a large number of mutations, mutation analysis may take a very long time. In this case, the number of mutations may be reduced, for example by choosing a certain kind of mutations or by randomly choosing a certain number of mutations.

U.S. Pat. No. 7,574,681 discusses a mutation-based test program evaluation system that obtains the waveforms from a same output port resulting from simulating the IC design with and without mutations. When output waveforms are different and yet the difference cannot be detected by the test program, there is likely a problem hidden in the test program. The severity of a hidden problem and the probability of the hidden problem being uncovered and subsequently fixed depend to a large degree on the nature and characteristics of the waveform difference.

For example, an IC design code and a set of test programs are received by a mutation-based test program evaluation system. By simulating or emulating the design code with the test programs, the mutation-based test program evaluation system obtains a set of waveforms from the output ports of the design code. The waveforms are called reference waveforms. Then, a small change, called a mutation or fault, is inserted into the design code, and the tests are re-run. The outputs are then called faulty outputs and the waveforms thus collected are called faulty waveforms. Depending on the mutation, some tests may generate faulty waveforms that are different from the reference waveforms, and others may generate faulty waveforms that are identical to the reference waveforms. Those runs producing different waveforms on output ports may or may not be detected by the test programs. The undetected differences may show hidden problems in the test programs. When there is a significant number of fault-test runs that produce undetected differences on faulty waveforms, users need guidance on which fault-test pair or pairs are more promising to look into.

Therefore, a method for ranking fault-test pairs in tracking down hidden problems and subsequently fixing the problems is desired.

BRIEF SUMMARY OF THE INVENTION

Embodiments of the present invention provide methods and systems for ranking fault-test pairs based on waveform statistics in a mutation-based test program evaluation system. In accordance with one embodiment, a method for ranking fault-test pairs comprises obtaining a first plurality of waveform statistics, the first plurality of waveform statistics including, in part, first value-change information regarding variations in logic HIGH and logic LOW for each bit of each reference output resulting from a test run of the design code, and obtaining a second plurality of waveform statistics, the second plurality of waveform statistics include, in part, second value-change information regarding variations in logic HIGH and logic LOW for each bit of each faulty output resulting from a test run of the design code injected with a fault. The method further includes, in part, obtaining relative differences between the first plurality of waveform statistics and the second plurality of waveform statistics for each bit of each faulty output with respect to the corresponding reference output, obtaining a waveform difference in response to the relative differences for each signal of each faulty output, and determining a ranking result of fault-test pairs in response to the waveform differences of the faulty outputs.

In another embodiment, a system for ranking fault-test pairs including test programs to verify a design code includes, in part, a processing unit and a display unit coupled to the processing unit. The processing unit is configured to run the design code using the test programs to obtain a first plurality of waveform statistics for a plurality of reference outputs resulting from various test runs of the design code and a second plurality of waveform statistics for a plurality of faulty outputs resulting from various test runs of the design code that is injected with a fault. The processing unit is further configured to calculate relative differences according to the first plurality of waveform statistics and the second plurality of waveform statistics for each bit of each faulty output with respect to the corresponding reference output. The processing unit is further configured to compute a waveform difference in response to the relative differences for each signal of each faulty output. The processing unit is further configured to determine a ranking result of fault-test pairs in response to the waveform differences of the faulty outputs. The display unit is configured to display the ranking result. In an embodiment, each of the first plurality of waveform statistics comprises first value-change information regarding variations in logic HIGH and logic LOW for each bit of each reference output resulting from a test run of the design code, and each of the second plurality of waveform statistics comprises second value-change information regarding variations in logic HIGH and logic LOW for each bit of each faulty output resulting from a test run of the design code injected with the fault.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
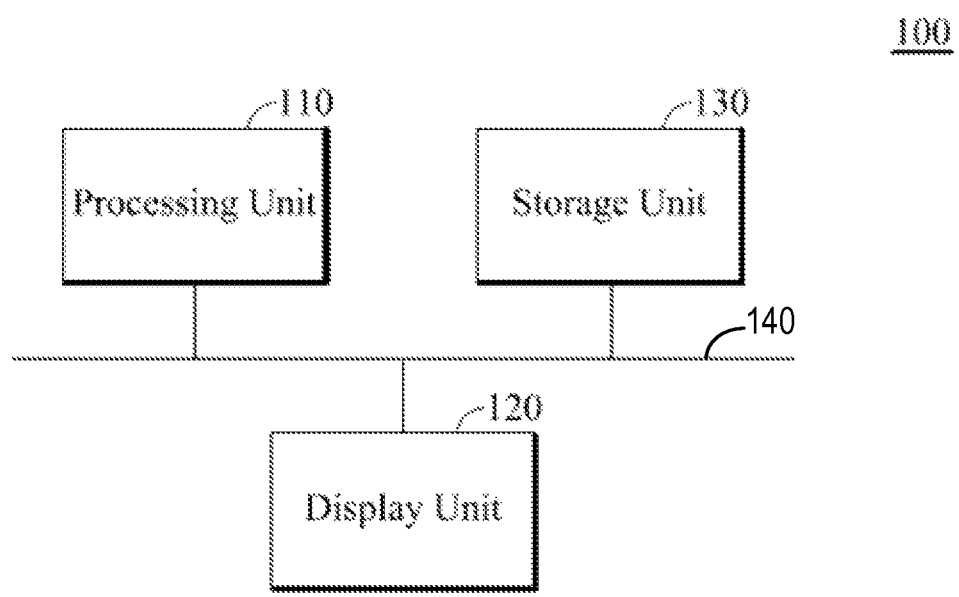
FIG. 1 is a simplified block diagram illustrating an embodiment of a mutation-based design verification evaluation system for ranking fault-test pairs according to an embodiment of the present invention.

FIG. 1 shows a block diagram illustrating an embodiment of a mutation-based design verification evaluation system 100 for ranking fault-test pairs according to an embodiment of the invention. System 100 can be implemented in an electronic device having a display, such as a computer system. System 100 may include a processing unit 110, a display unit 120, and a storage unit 130, which are connected with each other through a computer bus 140. Processing unit 110 may include one or more microprocessors configured to operate under the control of an operating system (not shown) and executes various software applications and programs such as simulation program, test and evaluation program, fault insertion program, comparison program, and others. Display unit may be, for example, an LCD display panel. In one example, computer executable programs may include a design code, a test suite, computer executable codes for ranking fault tests, and others. Storage 130 can be any type of suitable memory including the various types of dynamic random access memory (DRAM), static RAM, non-volatile memory (PROM, EPROM, EEPROM, flash), CDROM, DVD, hard disk drives, and others. Computer bus 140 can be any suitable physical or logical connection coupling the processing unit with other peripheral components.

In an embodiment, the design of a digital integrated circuit (IC) chip may be formed by writing a hardware description language (HDL) such as Verilog or VHDL. The HDL code that describes a portion or the entire IC chip is referred to as the design code. The design code may include a plurality of inputs ports and a plurality of output ports. A test suite used to simulate and verify the design code may include a plurality of test programs that are applied to the design code through the input ports. In an embodiment, the design code and test programs are stored in the storage unit 130. The processing unit 110 can simulate or emulate the design code with the test programs to obtain a plurality of reference waveforms at the output ports of the design code. Furthermore, the processing unit 110 can insert a fault into the design code and then simulate or emulate the design code having the fault with the same test programs to obtain a plurality of faulty waveforms at the output ports of the design code. Processing unit 110 computes a relative difference between one of the reference waveforms and one of the associated faulty waveforms for each output port. Processing unit 110 also generates a waveform difference based on the relative difference for each signal of each faulty output. In accordance with the present invention, each test program with the original design code may produce a reference waveform at an output port and each test program with the mutated design code (i.e., design code having an inserted fault) may produce a faulty waveform at the output port. In other words, each test program run will produce a fault-test pair including a reference waveform and a faulty waveform associated with the inserted fault. For a given test program, when three faults are separately inserted into the design code, there will be three fault-test pairs. It is noted that the inserted fault may not be detected by a given test program, so that the faulty waveform may be different or identical to the reference waveform. In other words, not all injected faults can be detected by a given test program, and not all test programs are capable of detecting a given injected fault. In an embodiment, processing unit 110 further performs ranking fault-test pairs without recording and dumping the reference waveforms and the faulty waveforms, thus reducing storage capacity for test evaluation. Additionally, system 100 may display related information generated by processing unit 110 on display unit 120.

Figure 2:
FIG. 2 shows a reference run performed by the mutation-based design verification evaluation system of FIG. 1.

FIG. 2 shows a reference run performed by the mutation-based design verification evaluation system 100 of FIG. 1. As shown, a test program 10 sends a plurality of input signals to an original design code 20. In response to the input signals, original design code 20 provides output signals via a plurality of output ports of design code 20 in the form of reference waveforms. In one embodiment, design code 20 may be run with test program 10 under a simulator other than the mutation-based design verification evaluation system 100, such as a software simulator, a hardware-based emulator as in the case of co-simulation, or a hardware-based simulation accelerator, and then the output signals of design code 20 are monitored by the mutation-based design verification evaluation system 100.

Figure 3:
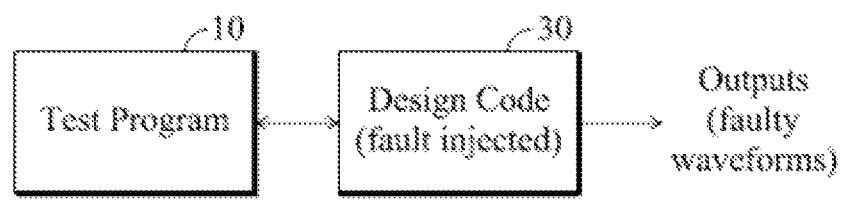
FIG. 3 shows a fault run performed by the mutation-based design verification evaluation system of FIG. 1.

FIG. 3 shows a fault run performed by the mutation-based design verification evaluation system 100 of FIG. 1. All configurations and operations are the same as the reference run of FIG. 2 with the exception that the faulty design code 30 contains a fault, also called a mutation, that has been injected in the original IC design 20 of FIG. 2. Similarly, in response to the input signals of test program 10, the fault-injected design code 30 provides the output signals via the plurality of output ports of the design code 20 in the form of faulty waveforms. Depending on the test programs and the injected fault, faulty waveforms may or may not be the same as the reference waveforms.

For each test program, a number of faults may be injected into the original design code of FIG. 2, each resulting in a set of faulty waveforms. Assuming T test programs are used and each test program may run against F injected faults (by running T test programs with the fault-injected design code 30 of FIG. 3), a total of T×F fault runs will be performed, resulting in T×F sets of faulty waveforms. Furthermore, T reference runs are performed (by running T test programs with the original design code 20), to obtain T sets of reference waveforms. Each fault-test run on a design code injected with a specific fault with a specific test program produces a specific faulty waveform, which together with the reference waveform obtained by running the same specific test program on the design code (without the specific injected fault) form a fault-test pair.

Figure 4:
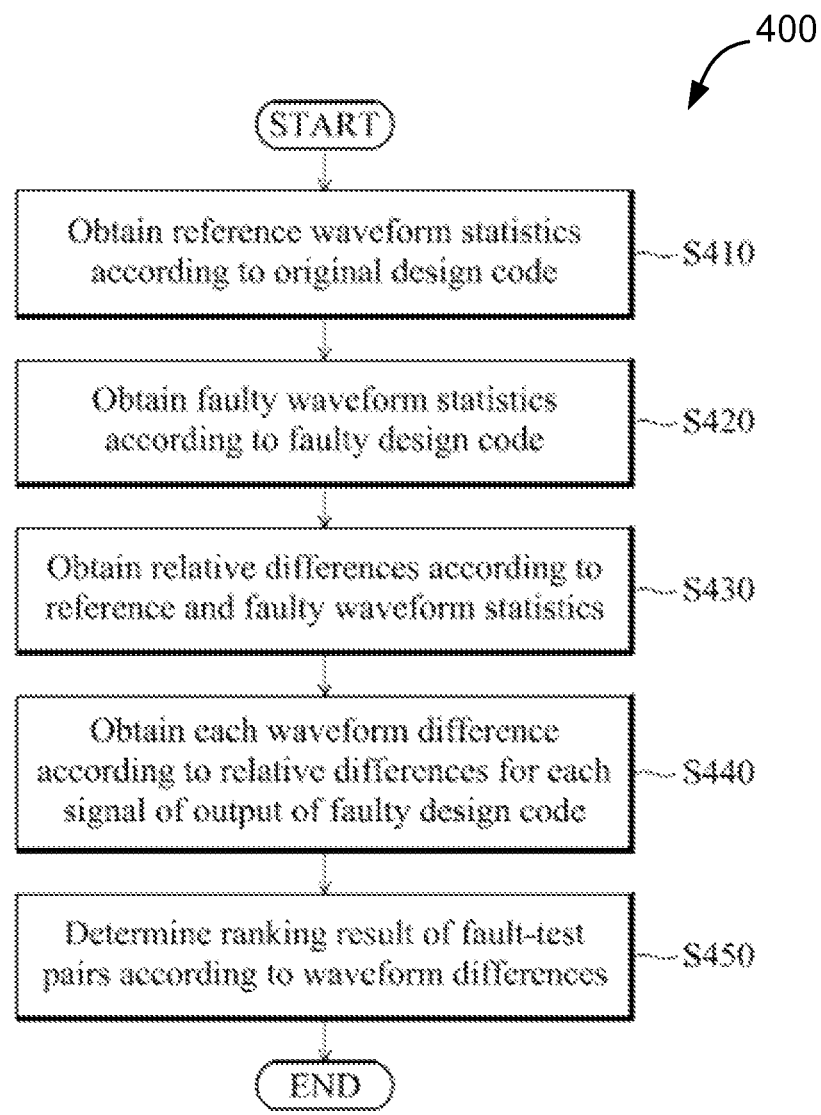
FIG. 4 shows a flowchart of a method for ranking fault-tests performed by a mutation-based design verification evaluation system according to an embodiment of the invention.

FIG. 4 shows a flow chart of steps of a method 400 for ranking fault-tests performed by a mutation-based design verification evaluation system (e.g., system 100 of FIG. 1) according to an embodiment of the invention. At S410, a multitude of test programs is applied to the original design code (see FIG. 2) to obtain a number of reference waveforms at the outputs of the design code. Processing unit 110 computes a plurality of reference waveform statistics from each bit of the outputs of the original design code (e.g., design code 20 of FIG. 2) during the reference runs. Waveform statistics may include a number of value changes, a mean and standard deviations of the time durations of the waveform values, and a tempo of the time durations. The computation of the waveform statistics will be described in more detail below. At S410, a number of faults is injected into the design code to obtain a faulty design code. Next, at S420, the test programs are applied to the faulty design code (see FIG. 3) for obtaining a plurality of faulty waveforms at the outputs of the faulty design code. Processing unit 110 computes a plurality of faulty waveform statistics from each bit of the outputs of the faulty design code (e.g. fault-injected design code 30 of FIG. 3) during the fault runs. Thereafter, at S430, relative differences between the reference and faulty waveform statistics are calculated. Thereafter, at S440, processing unit 110 generates waveform differences in response to the relative differences for each signal of the outputs of the faulty design code. Processing unit 110 also generates fault-test pairs, each including a reference waveform and an associated faulty waveform. Next, at S450, processing unit 110 determines a ranking of the fault-test pairs based on the waveform differences. In accordance with the present invention, a user is thus enabled to limit the number of investigations for ND (non-detected) problems by selecting the fault-test pairs that have the highest ranking.

For example, a waveform difference can be represented as DIFF(s,r), where s represents a faulty waveform of an output port from a fault run, and r represents a reference waveform of the same output port from a reference run. If there are T×F fault-test pairs, the mutation-based design verification evaluation system may obtain T×F sets of "s" (faulty waveforms) and T sets of "r" (reference waveforms) whose waveform statistics may then be computed. Computation of waveform statistics is described in detail below. Then, T×F sets of waveform differences DIFF(s,r) can be obtained by the mutation-based design verification evaluation system. Based on the waveform differences DIFF(s,r), a ranking for the T×F fault-test pairs is determined. Details of execution of the method for ranking fault-test are described below.

In one embodiment, the waveform statistics are collected/obtained on a per bit basis. For multi-bit signals, the waveform statistics are collected on each individual bit. Mathematically, the single bit waveform shown in FIG. 5 can be represented as a series of time-value pairs (where the values in adjacent pairs are always different), such as, (0, 0) (10, 1) (50, 0) (120, X) (150, Z) (180, 1) (220, 0) (260, 1).

The series represents a bit of an output port of the design code indicating that at time 0 (initiation), the value of the bit is at logic 0 (i.e. "LOW"). At time 10 ns, the value of the bit is at logic 1 (i.e. "HIGH"). At time 50 ns, the value of the bit is at logic 0. At time 120 ns, the value of the bit is at logic X (i.e. "unknown"). At time 150 ns, the value of the bit is at logic Z (i.e. "high impedance state"). At time 180 ns, the value of the bit is at logic 1. At time 220 ns, the value of the bit is at logic 0, and at time 260 ns, the value of the bit is at logic 1. Furthermore, the time durations of the series of time-value pairs can be represented as {10, 40, 70, 30, 30, 40, 40}. In the embodiment, the logic 0, 1, X or Z is used as an example to illustrate the waveform values, and does not limit the invention. In other embodiments, 2-value logic simulations (0, 1) or 9-value logic simulations (such as VHDL) can also be used to describe the waveform values for a signal of the output port. According to a series of time-value pairs, the waveform statistics are obtained from: (1) number of value changes, (2) mean and standard deviation of time durations and (3) tempo list and tempo occurrence ratio of time durations. Details of waveform statistics are described below.

Value Change Count

Figure 5:
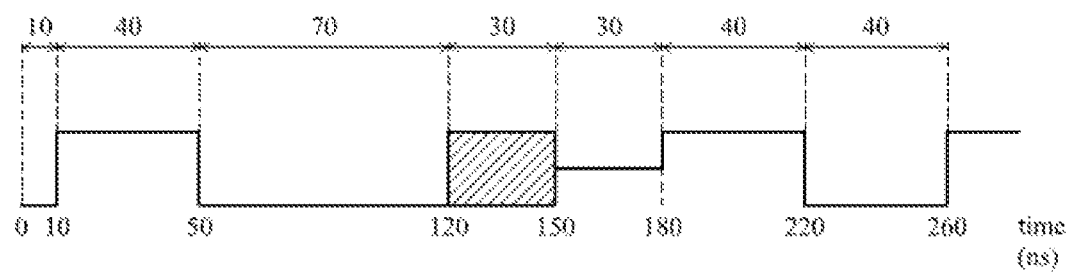
FIG. 5 is a graph showing a simulation result of a single bit waveform at an output of a design code according to an embodiment of the invention.

The term "value change count" refers to the number of time-value pairs in the series excluding the one at time zero (e.g. 0 ns). In the example of FIG. 5, the value change count is 7.

Mean and Standard Deviation of Time Durations

The term "durations" refers to time spans in which the waveform value stays unchanged. For a series of time-value pairs, since values in adjacent pairs are always different, durations are the deltas in time in adjacent pairs. To calculate mean and standard deviation of time durations in a series of time-value pairs, only the durations in which the value is logic 0 or 1 are considered, i.e. excluding logic X and logic Z. A mean (M) of time durations is a sum of all durations of logic 0 and logic 1 divided by the number of the durations of logic 0 and logic 1. A standard deviation (SD) is the square root of the sum of the square of the difference between the mean (M) and each duration of logic 0 and logic 1 and divided by the number of the durations of logic 0 and logic 1.

Therefore, the mean (M) and the standard deviation (SD) can be calculated by the following steps:

step a1. Time of the i-th time-value pair in the faulty waveform s is denoted by Time(s(i)) and the value of the i-th time-value pair in the faulty waveform s is denoted by Value(s(i)).

step a2. The length of i-th duration in s, denoted by Length(s(i)), is calculated by the formula:

$$Length(s(i))=Time(s(i+1))-Time(s(i)).$$

step a3. Let DS stand for the set {Length(s(i)) where Value(s(i)) is '0' or '1'}.

step a4. The mean of time durations for s, M(s), is calculated by the following formula:

$$M(s) = \frac{\sum_{i=1}^{nPulse\_DS} Length\_DS(i)}{nPulse\_DS}$$

where Length_DS(i) is the i-th element in DS, and nPulses_DS is the number of elements in DS.

step a5. The standard deviation of time durations for s, SD(s), is calculated by the following formula:

$$SD(s) = \sqrt{\frac{\sum_{i=1}^{nPulse\_DS}(\text{Length\_DS}(i) - M(s))^2}{nPulse\_DS}}.$$

In the time-value pairs example of FIG. 5, the series of the durations of logic 1 and logic 0 is {10, 40, 70, 40, 40}. Thus, the mean (M) is 40 (i.e. 200/5), and the standard deviation (SD) is 18.97.

Tempo of Time Durations

The term "tempo" refers to a measure of "repeating patterns" in a waveform, which consists of the following components:

(1) Value change count between two nearest durations of the same length (excluding durations whose values are at logic 'X' or 'Z');

(2) Total occurrences for each distinct value change count in (1); and (3) The ratio between the sum of major N occurrences and the sum of all occurrences in (2).

The ratio in (3) can be interpreted as the level of significance of most frequent repeating patterns. For clock signals with 50% duty cycle, the value change count in (1) is 1, and the ratio in (3) is also 1. For other duty cycles, the value change count in (1) is 2, and the ratio in (3) is still 1 (where N is set to 2). For random signals that toggle irregularly, each occurrence in (2) may be close to 1, and the ratio in (3) is approaching zero.

It should be noted that, when dealing with tempos, only the lengths of durations are considered no matter what the value is at logic 1 or logic 0. Furthermore, tempos for reference runs must be obtained first. Then, based on the major N tempos obtained in the corresponding reference runs that occur most frequently, tempos and counts can be collected for the fault runs, i.e. only tallying the toggle periods in fault runs whose tempos happen to be in the major N tempos in the corresponding reference runs. In one embodiment, N is set to 5.

Therefore, the tempo terms for reference runs are obtained according to the following steps:

step b1. Time of the i-th time-value pair in a one-bit reference waveform r is denoted by Time(r(i)), and the value of the i-th time-value pair in the one-bit reference waveform r is denoted by Value(r(i)). Furthermore, the i-th duration from the i-th time-value pair to the (i+1)-th time-value pair in the one-bit reference waveform r, denoted by D(i), is calculated by the formula:

$$D(i) = \text{Time}(r(i+1)) - \text{Time}(r(i)).$$

step b2. Calculate D(i) in the one-bit reference waveform r whose Value(r(i)) is at logic 1 or 0, i.e. durations that contain logic 'X' or 'Z' are excluded. Furthermore, set DR is the set of all D(i)'s, i.e. DR={D(i)}.

step b3. Check whether a length of each duration D(i) calculated in step b2 is equal to that of any previous duration D(j), wherein j is smaller than i and the previous duration D(j) is a duration nearest to D(i). Thus, D(i) is a repeating time duration of D(j).

step b4. A tempo T in the one-bit reference waveform r is calculated when D(i) is a repeating time duration of D(j), wherein T=i−j. That is, after T value changes, the duration D(i) is the same as the duration D(i).

step b5. For each tempo corresponding to the pair of D(i), D(j) that D(i) is the repeating time duration of D(j), a counter associated with the tempo T is increased by one.

step b6. The tempos are sorted in descending order according to the values of the counters. A tempo having the largest value of the count is called Top 1 tempo. Furthermore, a list is formed for the Top N tempos, and the list is a tempo list of the one-bit reference waveform r. In one embodiment, N is set to 5, and thereby the top 5 tempos form a tempo list for each waveform.

step b7. The number of tempo durations, denoted by nTempoPulses_r, is the total number of durations whose tempos appear in the tempo list of the one-bit reference waveform r. That is, the number of tempo durations nTempoPulse_r is the sum of the counters for the tempos in the tempo list constructed in step b6.

step b8. Tempo occurrence ratio for the one-bit reference waveform r, denoted by T(r), is defined as follows:

step b8-1. T(r) is −1 when the number of tempo durations nTempoPulse_r is 0 and the DR set in step b2 is empty.

step b8-2. T(r) is nTempoPulses_r/nPulses_DR, where nPulse_DR is the number of elements in DR set in step b2.

Furthermore, when the corresponding reference run has been done and the tempo list computed in step b6 is available, the tempo terms for fault runs are obtained according to the tempo list in the following steps:

step c1. Time of the i-th time-value pair in a one-bit faulty waveform s is denoted by Time(s(i)), and the value of the i-th time-value pair in the one-bit faulty waveform s is denoted by Value(s(i)). Furthermore, the i-th duration from the i-th time-value pair to the (i+1)-th time-value pair in the one-bit faulty waveform s, denoted by S(i), is calculated by the formula:

$$S(i) = \text{Time}(s(i+1)) - \text{Time}(s(i)).$$

step c2. Calculate S(i) in the one-bit faulty waveform s whose Value(s(i)) is at logic 1 or 0, i.e. durations that contain logic 'X' or 'Z' are excluded. Furthermore, set DS is the set of all S(i)'s, i.e. DS={S(i)}.

step c3. Check whether the length of each duration S(i) calculated in step c2 is equal to that of any previous duration S(j), wherein j is smaller than i and the previous duration S(j) is a duration nearest to S(i). Thus, S(i) is a repeating time duration of S(j). A tempo TS in the one-bit faulty waveform s is calculated when S(i) is a repeating time duration of S(j), wherein TS=i−j.

step c4. For each tempo TS corresponding to the pair of S(i), S(j) that S(i) is the repeating time duration of S(j), and TS is in the tempo list of the one-bit reference waveform r, a counter corresponding to the tempo TS is increased by one.

step c5. Sum all the counters resulted in step c4, and denote as nTempoPulses_s. step c6. Tempo occurrence ratio for the one-bit faulty waveform s with respect to the one-bit reference waveform r, denoted by T(s,r), is defined as follows:

step c6-1. T(s,r) is −1 when the sum of all the counters nTempoPulses_s is 0 and DS set in step c2 is empty.

step c6-2. T(s,r) is nTempoPulses_s/nPulses_DS, where nPulses_DS is the number of elements in set DS calculated in step c2.

Normalized Relative Differences

After all the waveform statistics of value-change count, mean, standard deviation, and tempo occurrence ratio on each signal in each fault run are obtained, relative differences are to be calculated according to the waveform statistics and then normalized.

Taking the value-change count as an example, the value-change count on a signal of a reference output is denoted by VC(r), and the value-change count on the same signal of the corresponding faulty output is denoted by VC(s). The relative difference in the value-change count is calculated by |VC(s)−VC(r)|/VC(r). Similarly, same type of calculations can be applied to relative differences in the mean, the standard deviation, and the tempo occurrence ratio on each signal for each faulty output. For example, the relative difference in the mean is calculated by |M(s)−M(r)|/M(r), wherein the mean on a signal of a reference output is denoted by M(r), and the mean on the same signal of the corresponding faulty output is denoted by M(s). The relative difference in the standard deviation is calculated by |SD(s)−SD(r)|/SD(r), wherein the standard deviation on a signal of a reference output is denoted by SD(r), and the standard deviation on the same signal of the corresponding faulty output is denoted by SD(s). In addition, the relative difference in the tempo occurrence ratio is calculated by |T(s,r)−T(r)|/T(r), wherein the tempo occurrence ratio on a signal of a reference output is denoted by T(r), and the tempo occurrence ratio on the same signal of the corresponding faulty output with respect to the reference output is denoted by T(s,r).

After all the relative differences have been obtained, the relative differences are normalized between 0 and 1 inclusively. The normalization is a logical step in determining the waveform differences on signals because otherwise, a relative difference term with a large absolute value may obscure the differences in other terms.

First, the minimum value (min) and the maximum value (max) among all relative differences in each category (VC, M, SD or T) are determined. Next, each relative difference V is normalized according to the following expression:

$$(V-\min)/(\max-\min).$$

In the embodiment, two methods are used to determine the minimum value (min) and the maximum value (max) of the relative differences: global or bit-by-bit. The global method is used to determine the minimum value and the maximum value in each category (VC, M, SD, T) among all bits in all fault runs. The bit-by-bit method is used at the bit level instead of the global level. So, each bit has a minimum value and a maximum value in each category chosen from all the relative differences on the bit in all fault runs.

Waveform Difference for Single-Bit Signals

In accordance with the invention, a waveform difference for a single-bit signal in a fault run (denoted by s) versus in a reference run (denoted by r) is calculated as a weighted sum of normalized relative differences of the fault run s with respect to the reference run r. The normalized relative differences in the value-change count, the mean, the standard deviation, and the tempo occurrence ratio on the fault run s with respect to the reference run r are denoted by normalized_relative_difference_VC(s,r), normalized_relative_difference_M(s,r), normalized_relative_difference_SD(s,r), and normalized_relative_difference_T(s,r), respectively. Therefore, a waveform difference can be obtained according to following formula:

$$\mathrm{DIFF}(s,r) = \mathrm{Weight}(VC) \times \text{normalized\_relative\_difference\_VC}(s,r) + \mathrm{Weight}(M) \times \text{normalized\_relative\_difference\_M}(s,r) + \mathrm{Weight}(SD) \times \text{normalized\_relative\_difference\_SD}(s,r) + \mathrm{Weight}(T) \times \text{normalized\_relative\_difference\_T}(s,r),$$

where DIFF(s, r) is the difference for single-bit faulty waveform s with respect to single-bit reference waveform r, and Weight(VC), Weight(M), Weight(SD) and Weight(T) are the weights assigned to the value-change term, the mean term, the standard deviation term, and the tempo term, respectively. In one embodiment, the typical value of Weight (VC) is 0.3, the typical value of Weight(M) is 0.15, the typical value of Weight(SD) is 0.15, and the typical value of Weight(T) is 0.4. It should be noted that the difference DIFF(s, r) will be zero if the faulty waveform s is identical to the reference waveform r. Furthermore, if the faulty waveform s is different from the reference waveform r, the difference DIFF(s, r) will be greater than zero. Therefore, the larger the difference DIFF(s,r) value is, the bigger the waveform difference between the faulty waveform s and the reference waveform r will be.

Waveform Difference for Multi-Bit Signals

In accordance with the present invention, a waveform difference for a multi-bit signal in a fault run versus in a reference run is calculated by the following steps:

step d1. The waveform difference of each bit of the multi-bit signal with respect to the corresponding bit in the reference waveform is obtained according to the method described above.

step d2: The differences of all bits are summed up, and the summed differences are multiplied by a scaling factor SF(n), where n is the number of bits in the multi-bit signal.

For example, the difference of an n-bit faulty waveform s with respect to a reference waveform r can be expressed in the following formula:

$$\mathrm{DIFF}(s,r) = \mathrm{SF}(n) \ast (\mathrm{DIFF}(s(1),r(1)) + \mathrm{DIFF}(s(2),r(2)) \ldots + \mathrm{DIFF}(s(n),r(n))),$$

where DIFF(s, r) is the difference for multi-bit waveform s with respect to multi-bit waveform r, n is the number of bits in the multi-bit signal, and SF(n) is a scaling factor that is a function of n. DIFF(s(i),r(i)) is the waveform difference computed using the formula for computing single-bit DIFF, which is described above. In one embodiment, the typical function for SF(n) is (Log 2(2*n))/n, wherein the scaling function is roughly the inverse of the number of bits in the multi-bit signal.

Ranking Fault-Test Pairs Based on Waveform Differences

Once all the waveform differences for faulty outputs are calculated with respect to their corresponding reference outputs, a rank is determined for the fault-test pairs that generate the faulty outputs. The rank is obtained by sorting the faulty outputs. Generally, in sorting algorithms, if a comparison function can determine the ordering of any two given elements in a set, the set can be sorted. Therefore, a comparison method is needed that can determine the ordering of any two faulty outputs. Taking a comparison between two faulty outputs as an example, the waveform differences on the two faulty outputs are:

$$\{\mathrm{DIFF}(S1_1,R1_1), \mathrm{DIFF}(S1_2,R1_2), \ldots \mathrm{DIFF}(S1_p,R1_p)\},$$
and $$\{\mathrm{DIFF}(S2_1,R2_1), \mathrm{DIFF}(S2_2,R2_2), \ldots \mathrm{DIFF}(S2_p,R2_p)\},$$

where p is the number of output signals on the design code, and DIFF($Si_j$, $Ri_j$) is the waveform difference on signal j in faulty output Sj with respect to the corresponding reference output Rj. In the embodiment, two methods are used for ranking the fault runs: the max method and the voting method.

The Max Method

First, a maximum value in {DIFF($S1_1$, $R1_1$), DIFF($S1_2$, $R1_2$), ... DIFF($S1_p$, $R1_p$)} is obtained, and a maximum value in {DIFF($S2_1$, $R2_1$), DIFF($S2_2$, $R2_2$), ... DIFF($S2_p$, $R2_p$)} is obtained, and then the two maximum values are compared to determine which maximum value is larger than the other. According to the max method, the output port of the faulty design code which exhibits the largest waveform difference can serve as the representative of the faulty output. Therefore, the ranking of two faulty outputs can simply be determined by comparing the largest waveform difference found in each run.

The Voting Method

First, the waveform differences on each port of the two faulty outputs, say S1 and S2, are computed with respect to their corresponding reference outputs, say R1 and R2. Next, the waveform differences on each signal in faulty outputs S1 and S2 with respect to the corresponding reference outputs R1 and R2 are compared, and the comparison results are summed according to the following formula:

Votes(S1)=Sum of {DIFF(S1$_i$,R1$_i$) where DIFF(S1$_i$, R1$_i$)>DIFF(S2$_i$,R2$_i$)};

Votes(S2)=Sum of {DIFF(S2$_i$,R2$_i$) where DIFF(S2$_i$, R2$_i$)>DIFF(S1$_i$,R1$_i$)}.

In other words, the votes for a faulty output are the sum of its waveform differences which are larger than the corresponding waveform differences of the other faulty output. Then, the ranking of the two runs is determined according the values of Votes(S1) and Votes(S2).

Ranking of Fault Runs Suggesting the Fixing Order for Users

According to the embodiments, the ranking methods can produce the ordering for the user to investigate the fault run results. In a mutation-based test environment evaluation system (e.g. 100 of FIG. 1), the number of fault runs is typically in the thousands or more. Without an ordering, users can only randomly pick fault runs to investigate, and the result may be fruitless. By obtaining the waveform differences and ranking fault-run results according to the disclosed method, users can pick the fault runs with the highest rank to start investigating. The result is usually much better.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer-implemented method of ranking fault-test pairs in a mutation-based test programs evaluation system wherein the test programs are used to verify a design of an integrated circuit, the method comprising:

obtaining, via the computer, a first plurality of waveform statistics associated with the design of the integrated circuit, wherein each of the first plurality of waveform statistics comprises first value-change information regarding variations in logic HIGH and logic LOW for each bit of each reference output resulting from a test run of the design of the integrated circuit;

obtaining, via the computer, a second plurality of waveform statistics associated with the design of the integrated circuit, wherein each of the second plurality of waveform statistics comprises second value-change information regarding variations in logic HIGH and logic LOW for each bit of each faulty output resulting from a test run of the design of the integrated circuit injected with a fault;

obtaining, via the computer, relative differences between the first plurality of waveform statistics and the second plurality of waveform statistics for each bit of each faulty output with respect to the corresponding reference output;

obtaining, via the computer, waveform differences in response to the relative differences for each signal of each faulty output; and determining, via the computer, a ranking of fault-test pairs in response to the waveform differences of the faulty outputs.

2. The computer-implemented method as claimed in claim 1, wherein the first value-change information comprises a first value-change count representing a number of value changes for each bit of each reference output, and the second value-change information comprises a second value-change count representing a number of value changes for each bit of each faulty output.

3. The computer-implemented method as claimed in claim 2, wherein the first value-change information further comprises a first mean and a first standard deviation of durations of logic HIGH and logic LOW for each bit of each reference output, and the second value-change information further comprises a second mean and a second standard deviation of durations of logic HIGH and logic LOW for each bit of each faulty output.

4. The computer-implemented method as claimed in claim 3, wherein the first value-change information further comprises a tempo list and a first tempo occurrence ratio of durations of logic HIGH and logic LOW for each bit of each reference output, and the second value-change information further comprises a second tempo occurrence ratio of durations of logic HIGH and logic LOW corresponding to the tempo list of the first value-change information for each bit of each faulty output.

5. The computer-implemented method as claimed in claim 4, wherein the step of obtaining the relative differences between the first plurality of waveform statistics and the second plurality of waveform statistics for each bit of each faulty output with respect to the corresponding reference output further comprises:

obtaining, via the computer, a relative difference in the value-change count according to the first and second value-change counts for each bit in the faulty output with respect to the corresponding bit in the reference output;

obtaining, via the computer, a relative difference in the mean according to the first and second means of durations of logic HIGH and logic LOW for each bit in the faulty output with respect to the corresponding bit in the reference output;

obtaining, via the computer, a relative difference in the standard deviation according to the first and second standard deviations of durations of logic HIGH and logic LOW for each bit in the faulty output with respect to the corresponding bit in the reference output; and obtaining, via the computer, a relative difference in the tempo occurrence ratio according to the first and second tempo occurrence ratios for each bit in the faulty output with respect to the corresponding bit in the reference output.

6. The computer-implemented method as claimed in claim 5, wherein the relative difference in the value-change count is $$\frac{|VC(s) - VC(r)|}{VC(r)},$$

the relative difference in the mean is $$\frac{|M(s) - M(r)|}{M(r)},$$

the relative difference in the standard deviation is $$\frac{|SD(s) - SD(r)|}{SD(r)},$$

and the relative difference in the tempo occurrence ratio is $$\frac{|T(s, r) - T(r)|}{T(r)},$$

wherein VC(r) and VC(s) respectively represent the first and second value-change counts, M(r) and M(s) respectively represent the first and second means, SD(r) and SD(s) respectively represent the first and second standard deviations, and T(r) and T(s,r) respectively represent the first and second tempo occurrence ratios.

7. The computer-implemented method as claimed in claim 5, wherein the step of obtaining the relative differences between the first plurality of waveform statistics and the second plurality of waveform statistics for each bit of each faulty output with respect to the corresponding reference output further comprises:
   determining, via the computer, a minimum difference and a maximum difference among the relative differences in the value-change count, the mean, the standard deviation and the tempo occurrence ratio, respectively; and
   normalizing, via the computer, each of the relative differences according to the minimum difference and the maximum difference of the relative differences in the value-change count, the mean, the standard deviation, and the tempo occurrence ratio, respectively.

8. The computer-implemented method as claimed in claim 7, wherein the relative difference is normalized by the following formula:

$$\frac{V - \min}{\max - \min},$$

wherein V represents the relative difference, and min and max represent the minimum difference and the maximum difference of the relative differences in the value-change count, the mean, the standard deviation or the tempo occurrence ratio.

9. The computer-implemented method as claimed in claim 5, wherein the step of obtaining the relative differences according to the first plurality of waveform statistics and the second plurality of waveform statistics for each bit of each faulty output with respect to the corresponding reference output further comprises:
   determining, via the computer, a minimum difference and a maximum difference among the relative differences on the same bit in the value-change count, the mean, the standard deviation, and the tempo occurrence ratio, respectively; and
   normalizing, via the computer, each of the relative differences according to the minimum difference and the maximum difference of the relative differences on the same bit in the value-change count, the mean, the standard deviation and the tempo occurrence ratio, respectively.

10. The computer-implemented method as claimed in claim 9, wherein the relative difference is normalized by the following expression:

$$\frac{V - \min}{\max - \min},$$

wherein V represents the relative difference, and min and max represent the minimum difference and the maximum difference of the relative differences on the same bit in the value-change count, the mean, the standard deviation, or the tempo occurrence ratio.

11. The computer-implemented method as claimed in claim 5, wherein the step of obtaining the waveform difference according to the relative differences for each signal of each faulty output further comprises:
   weighting, via the computer, the relative differences in the value-change count, the mean, the standard deviation and the tempo occurrence ratio, respectively;
   summing, via the computer, the weighted relative differences for each signal of each faulty output; and
   summing, via the computer, the summed relative differences to obtain the waveform difference for each faulty output.

12. The computer-implemented method as claimed in claim 11, wherein the step of weighting the relative differences in the value-change count, the mean, the standard deviation, and the tempo occurrence ratio, respectively, further comprises:
   assigning, via the computer, a first weight to the relative differences in the value-change count;
   assigning, via the computer, a second weight to the relative differences in the mean and the standard deviation, respectively; and
   assigning, via the computer, a third weight to the relative differences in the tempo occurrence ratio,
   wherein the third weight is larger than the first weight, and the first weight is larger than the second weight.

13. The computer-implemented method as claimed in claim 1, wherein the step of determining the ranking result according to the waveform differences of the faulty outputs further comprises:
   obtaining, via the computer, a maximum waveform difference among the waveform differences for each faulty output; and
   sorting, via the computer, the maximum waveform differences of the faulty outputs to determine the ranking result.

14. The computer-implemented method as claimed in claim 1, wherein the step of determining the ranking result according to the waveform differences of the faulty outputs further comprises:
   determining, via the computer, the ranking result by sorting a first faulty output and a second faulty output with a comparison function on the waveform differences, wherein the step of determining the ranking result by sorting the first and second faulty outputs further comprises:
   comparing, via the computer, the waveform differences for the same signal of the first and second faulty outputs to obtain a larger waveform difference for each signal;

summing, via the computer, the larger waveform differences for the first and the second faulty outputs; and determining, via the computer, the ranking result of the first and the second faulty outputs based on the summed larger waveform differences.

15. A system for ranking fault-test pairs comprising test programs to verify a design of an integrated circuit, the system comprising:
a processing unit configured to run the test programs on the design of the integrated circuit to:
obtain a first plurality of waveform statistics for a plurality of reference outputs of the design of the integrated circuit;
obtain a second plurality of waveform statistics for a plurality of faulty outputs of the design of the integrated circuit being injected with a fault,
obtain relative differences between the first plurality of waveform statistics and the second plurality of waveform statistics for each bit of each faulty output with respect to the corresponding reference output,
obtain a waveform difference between the relative differences for each signal of each faulty output, and
determine a ranking of fault-test pairs in response to the waveform differences of the faulty outputs; and
a display unit coupled to the processing unit and configured to display the ranking,
wherein each of the first plurality of waveform statistics comprises first value-change information regarding variations in logic HIGH and logic LOW for each bit of each reference output resulting from a test run of the design of the integrated circuit, and each of the second plurality of waveform statistics comprises second value-change information regarding variations in logic HIGH and logic LOW for each bit of each faulty output resulting from a test run of the design of the integrated circuit injected with a fault.

16. The system as claimed in claim 15, wherein the first value-change information comprises a first value-change count representing the number of the value changes for each bit of each reference output, and the second value-change information comprises a second value-change count representing the number of the value changes for each bit of each faulty output.

17. The system as claimed in claim 16, wherein the first value-change information further comprises a first mean and a first standard deviation of durations of logic HIGH and logic LOW for each bit of each reference output, and the second value-change information further comprises a second mean and a second standard deviation of durations of logic HIGH and logic LOW for each bit of each faulty output.

18. The system as claimed in claim 17, wherein the first value-change information further comprises a tempo list and a first tempo occurrence ratio of durations of logic HIGH and logic LOW for each bit of each reference output, and the second value-change information further comprises a second tempo occurrence ratio of durations of logic HIGH and logic LOW corresponding to the tempo list of the first value-change information for each bit of each faulty output.

19. The system as claimed in claim 18, wherein a relative difference in the value-change count is obtained by the processing unit according to the first and second value-change counts for each bit in the faulty output with respect to the corresponding bit in the reference output; a relative difference in the mean is obtained by the processing unit according to the first and second means of durations of logic HIGH and logic LOW for each bit in the faulty output with respect to the corresponding bit in the reference output; a relative difference in the standard deviation is obtained by the processing unit according to the first and second standard deviations of durations of logic HIGH and logic LOW for each bit in the faulty output with respect to the corresponding bit in the reference output; and a relative difference in the tempo occurrence ratio is obtained by the processing unit according to the first and second tempo occurrence ratios for each bit in the faulty output with respect to the corresponding bit in the reference output.

20. The system as claimed in claim 19, wherein the relative difference in the value-change count is $$\frac{|VC(s) - VC(r)|}{VC(r)},$$

the relative difference in the mean is $$\frac{|M(s) - M(r)|}{M(r)},$$

the relative difference in the standard deviation is $$\frac{|SD(s) - SD(r)|}{SD(r)},$$

and the relative difference in the tempo occurrence ratio is $$\frac{|T(s, r) - T(r)|}{T(r)},$$

wherein VC(r) and VC(s) respectively represent the first and second value-change counts, M(r) and M(s) respectively represent the first and second means, SD(r) and SD(s) respectively represent the first and second standard deviations, and T(r) and T(s,r) respectively represent the first and second tempo occurrence ratios.

21. The system as claimed in claim 19, wherein a minimum difference and a maximum difference among the relative differences in the value-change count, the mean, the standard deviation and the tempo occurrence ratio are respectively determined by the processing unit, and each of the relative differences is normalized according to the minimum difference and the maximum difference of the relative differences in the value-change count, the mean, the standard deviation, and the tempo occurrence ratio, respectively.

22. The system as claimed in claim 21, wherein the relative difference is normalized by the following expression:

$$\frac{V - \min}{\max - \min},$$

wherein V represents the relative difference, and min and max represent the minimum difference and the maximum difference of the relative differences in the value-change count, the mean, the standard deviation, or the tempo occurrence ratio.

23. The system as claimed in claim 19, wherein a minimum difference and a maximum difference among the relative differences on the same bit in the value-change count, the mean, the standard deviation, and the tempo occurrence ratio are respectively determined by the processing unit, and each of the relative differences is normalized by the processing unit according to the minimum difference and the maximum difference of the relative differences on the same bit in the value-change count, the mean, the standard deviation, and the tempo occurrence ratio, respectively.

24. The system as claimed in claim 23, wherein the relative difference is normalized by the following expression:

$$\frac{V - min}{max - min},$$

wherein V represents the relative difference, and min and max represent the minimum difference and the maximum difference of the relative differences on the same bit in the value-change count, the mean, the standard deviation, or the tempo occurrence ratio.

25. The system as claimed in claim 19, wherein the processing unit weights the relative differences in the value-change count, the mean, the standard deviation, and the tempo occurrence ratio, respectively, and sums the weighted relative differences for each signal of each faulty output, wherein the processing unit further sums the summed relative differences to obtain the waveform difference for each faulty output.

26. The system as claimed in claim 25, wherein the processing unit assigns a first weight to the relative differences in the value-change count, a second weight to the relative differences in the mean and the standard deviation, respectively, and a third weight to the relative differences in the tempo occurrence ratio, wherein the third weight is larger than the first weight, and the first weight is larger than the second weight.

27. The system as claimed in claim 15, wherein the processing unit obtains a maximum waveform difference among the waveform differences for each faulty output, and the processing unit sorts the maximum waveform differences of the faulty outputs to determine the ranking result.

28. The system as claimed in claim 15, wherein the processing unit compares the waveform differences for the same signal of first and second faulty outputs to obtain a larger waveform difference for each signal, sums the larger waveform differences for the first and second faulty outputs, and determines the ranking result of the first and the second faulty outputs based on the summed larger waveform differences.

* * * * *

UNITED STATES PATENT AND TRADEMARK OFFICE
CERTIFICATE OF CORRECTION

PATENT NO. : 9,658,947 B2  
APPLICATION NO. : 13/769028  
DATED : May 23, 2017  
INVENTOR(S) : Tien-Chun Wei et al.

Page 1 of 1

It is certified that error appears in the above-identified patent and that said Letters Patent is hereby corrected as shown below:

On the Title Page

"(72) Inventors: Tien-Chun Wei, New Taipei City (TW);
Jean-Marc Albert Forey, Grenoble (FR);
Kai Yang, Fremont, CA (US);
Kuo-Ching Lin, Taichung (TW);
Michael Lyons, Voreppe (FR)"

Should read:

--(72) Inventors: Tien-Chun Wei, New Taipei City (TW);
Jean-Marc Albert Forey, Grenoble (FR);
Kai Yang, Fremont, CA (US);
Kuo-Ching Lin, Taichung City (TW);
Michael Lyons, Voreppe (FR)--

Signed and Sealed this  
Twenty-fifth Day of July, 2017

Joseph Matal  
*Performing the Functions and Duties of the  
Under Secretary of Commerce for Intellectual Property and  
Director of the United States Patent and Trademark Office*